United States Patent
Matsumoto et al.

(10) Patent No.: US 11,162,525 B2
(45) Date of Patent: Nov. 2, 2021

(54) EXTERNAL THREAD MEMBER

(71) Applicant: TOPURA CO., LTD., Hadano (JP)

(72) Inventors: Kuninori Matsumoto, Hadano (JP);
Mayumi Matsuno, Hadano (JP)

(73) Assignee: TOPURA CO., LTD., Hadano (JP)

( * ) Notice: Subject to any disclaimer, the term of this patent is extended or adjusted under 35 U.S.C. 154(b) by 317 days.

(21) Appl. No.: 16/470,972

(22) PCT Filed: Nov. 20, 2017

(86) PCT No.: PCT/JP2017/041711
§ 371 (c)(1),
(2) Date: Jun. 18, 2019

(87) PCT Pub. No.: WO2018/116724
PCT Pub. Date: Jun. 28, 2018

(65) Prior Publication Data
US 2019/0376548 A1 Dec. 12, 2019

(30) Foreign Application Priority Data
Dec. 19, 2016 (JP) .............................. JP2016-245171

(51) Int. Cl.
*F16B 39/26* (2006.01)
*F16B 5/02* (2006.01)
*F16B 25/00* (2006.01)

(52) U.S. Cl.
CPC ............ *F16B 39/26* (2013.01); *F16B 5/0241* (2013.01); *F16B 25/00* (2013.01)

(58) Field of Classification Search
CPC .......... F16B 5/004; F16B 5/02; F16B 5/0241; F16B 25/00; F16B 33/008; F16B 35/00;
(Continued)

(56) References Cited

U.S. PATENT DOCUMENTS 765,139 A * 7/1904 Hirsch .................... F16B 43/00
411/368
3,156,281 A * 11/1964 Demi ...................... F16B 39/24
411/147
(Continued)

FOREIGN PATENT DOCUMENTS

JP S53-090768 U 7/1978
JP S55-024298 A 2/1980
(Continued)

*Primary Examiner* — Roberta S Delisle
(74) *Attorney, Agent, or Firm* — Harness, Dickey & Pierce, P.L.C.

(57) ABSTRACT

An external thread member capable of performing a fastening operation efficiently without increasing the number of parts by assembling a collar into the external thread member. The external thread member 1 includes a shaft portion 5 inserted into a mounting hole 105 of a mounting member 101 through a collar 7, and the mounting member 101 is fastened to a fastening member 102. The shaft portion 5 includes a threaded portion 51 and a neck portion 52. The collar 7 is mounted on the neck portion 52 so as to be rotatable relative to each other and is engaged with the threaded portion 51 whereby retention is achieved. A counterbore hole 106 is formed in an opening close to the mounting hole 105 of an internal thread hole 104 with a tubular portion 71 inserted into the mounting hole 105 of the collar 7.

20 Claims, 9 Drawing Sheets

(58) Field of Classification Search
CPC .......... F16B 39/10; F16B 39/14; F16B 39/24; F16B 39/26; F16B 39/34; F16B 39/36; F16B 43/00; Y10S 411/998; Y10T 403/75
USPC ........ 411/132–133, 143, 147, 148, 367, 378, 411/383, 546
See application file for complete search history.

(56) References Cited

U.S. PATENT DOCUMENTS

| | | | | |
|---|---|---|---|---|
| 3,682,440 A | * | 8/1972 | Walker | F16B 7/06 254/29 A |
| 3,687,184 A | * | 8/1972 | Wagner | F16B 43/00 411/135 |
| 4,193,434 A | | 3/1980 | Wagner | |
| 4,238,165 A | | 12/1980 | Wagner | |
| 4,850,771 A | * | 7/1989 | Hurd | F16B 4/004 411/43 |
| 4,925,364 A | * | 5/1990 | Das | F01D 17/162 415/150 |
| 5,018,920 A | * | 5/1991 | Speakman | B21J 15/02 411/339 |
| 5,577,854 A | * | 11/1996 | Jacob | B60G 7/00 280/93.508 |
| 6,659,702 B2 | * | 12/2003 | Kitayama | F16B 43/001 403/408.1 |
| 2011/0097176 A1 | * | 4/2011 | Ichishima | B62D 21/11 411/367 |
| 2011/0311333 A1 | * | 12/2011 | Schaser | F16B 43/001 411/378 |
| 2013/0202450 A1 | * | 8/2013 | Ivakitch | F16B 5/02 416/248 |

FOREIGN PATENT DOCUMENTS

| | | |
|---|---|---|
| JP | S55-100413 A | 7/1980 |
| JP | S63-074514 U | 5/1988 |
| JP | 2016-114139 A | 6/2016 |
| JP | 5958371 B2 | 7/2016 |

* cited by examiner

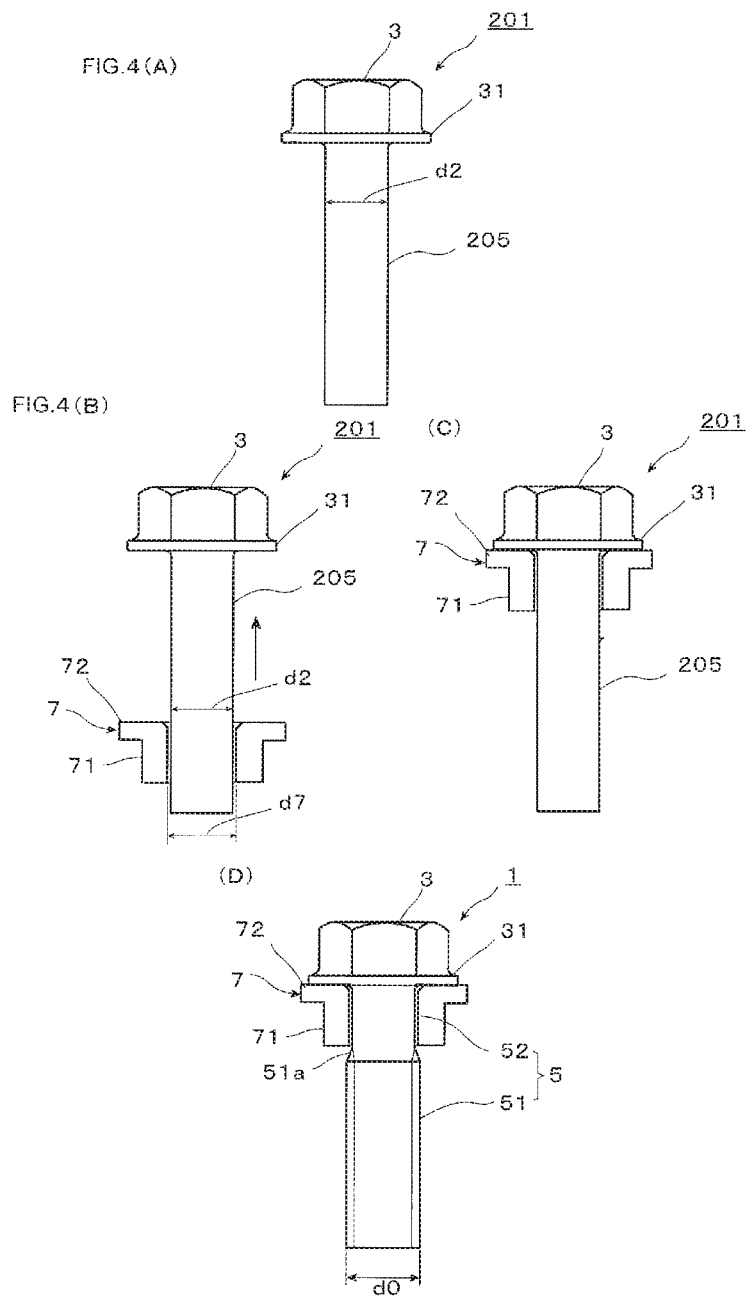

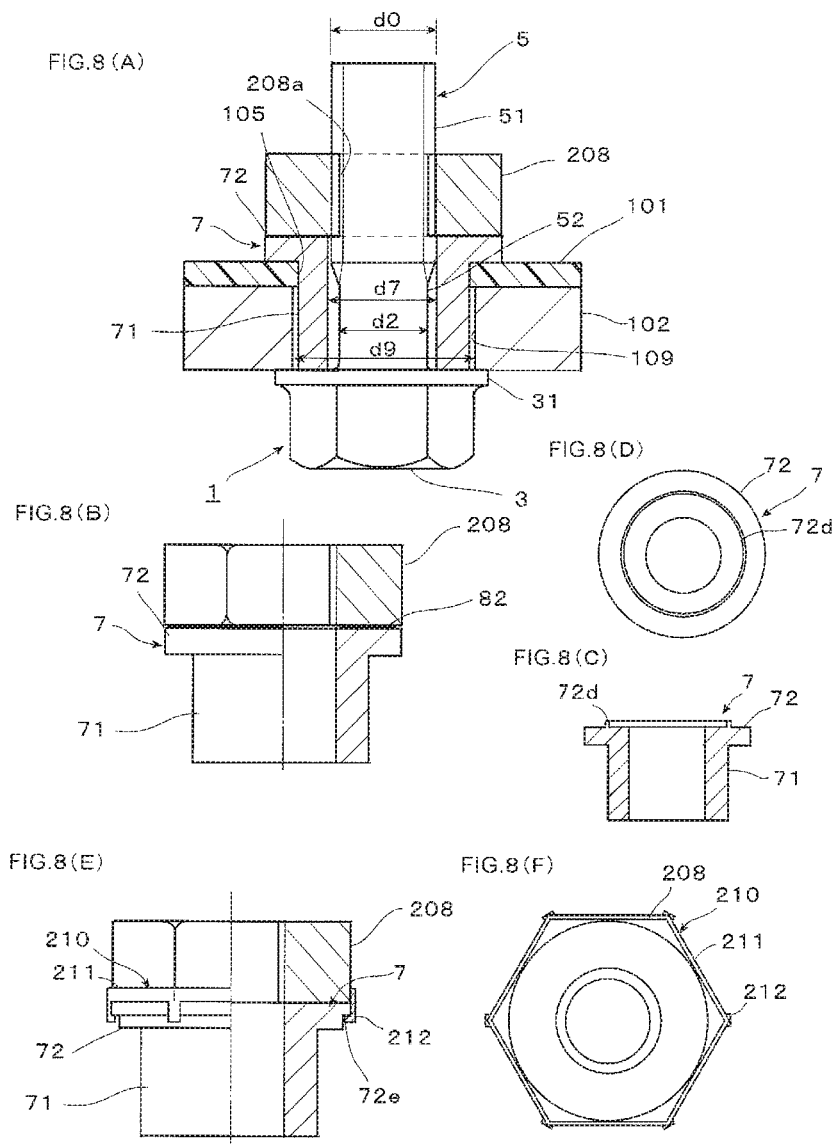

EXTERNAL THREAD MEMBER

CROSS-REFERENCE TO RELATED APPLICATIONS

This application is a National Stage of International Application No. PCT/JP2017/041711, filed Nov. 20, 2017 (now WO 2018/116724A1), which claims priority to Japanese Application No. 2016-245171, filed Dec. 19, 2016. The entire disclosures of each of the above applications are incorporated herein by reference.

FIELD

The present disclosure relates to an external thread member and an internal thread member for fixing a mounting member formed of a resin or the like to a fastening member formed of metal or the like, and particularly, relates to an external thread member in which a collar mounted into a mounting hole of a mounting member is integrally assembled.

BACKGROUND

Conventionally, a fastening structure in which a flanged collar is mounted into a mounting hole of a mounting member and the mounting member is fastened to a fastening member through the collar when a mounting member formed of a resin such as a resin material or a carbon fiber-reinforced resin material is fastened to a hard fastening member using a bolt is known.

In Japanese Patent No. 5958371, during a fastening operation, a collar is mounted into a mounting hole of a resin panel, a metal panel is stacked thereon, and the panels are fastened and fixed by a bolt and a nut.

In Japanese Patent Application Publication No. 2016-114139, a collar is bonded and fixed to a mounting hole of a carbon fiber-reinforced resin material in advance, the carbon fiber-reinforced resin material with the collar and a fastening member are stacked and are fastened and fixed by a bolt and a nut.

When two members are fastened through the collar, since an axial thrust of the bolt is applied to the hard fastening member via the collar, it is possible to prevent loss of fastening load (decrease in axial thrust) resulting from creep deformation of the mounting member.

SUMMARY

Technical Problem

However, in the case of Japanese Patent No. 5958371, since it is necessary to insert the collar into the mounting hole of the mounting member and insert a bolt to fasten the mounting member in the fastening operation, there is a problem that two steps including a collar insertion step and a bolt fastening step are required, and the fastening operation requires a considerable amount of time.

In the case of Japanese Patent Application Publication No. 2016-114139, although the number of parts corresponding to the collar can be reduced and the efficiency of the fastening operation can be enhanced if the carbon fiber-reinforced resin material with the collar is prepared, since the collar is bonded to the carbon fiber-reinforced resin material by an adhesive, there is a problem that curing time is required and efficient production is difficult. Therefore, although the collar may be insert-molded into a carbon fiber-reinforced resin material, there is a problem that a new mold is required and the cost increases.

The present disclosure has been made to solve the problems of the conventional technology, and an object thereof is to provide an external thread member with collar capable of performing a fastening operation efficiently without increasing the number of parts.

Solution to Problem

In order to attain the object, the present disclosure provides an external thread member including a shaft portion having a threaded portion and a head portion, in which the shaft portion is inserted into a mounting hole of a mounting member through a collar and the mounting member is fastened to a fastening member, wherein the collar is integrally assembled into the shaft portion, the collar includes a tubular portion and a flange portion formed at one end of the tubular portion, and the flange portion is in direct contact with an opening edge of a mounting hole of the mounting member, and when an internal thread hole corresponding to the mounting hole is formed in the fastening member to which the mounting member is attached, and a counterbore hole is formed at an opening close to the mounting hole of the internal thread-hole, an axial length of the tubular portion inserted into the mounting hole of the collar is larger than a sum of an axial length of the mounting hole and a depth of the counterbore hole by an amount corresponding to a difference between an amount of elongation of the collar and an amount of elongation due to thermal expansion of the mounting member and the fastening member at a highest temperature of an expected service environment.

According to the present disclosure, since the collar assembled into the shaft portion is automatically fitted into the mounting hole in the course of a fastening operation, it is not necessary to form the collar in the mounting member and it is possible to reduce the number of parts and to reduce the number of steps of the fastening operation. Particularly, it is possible to avoid thermal stress which can occur in a mounting member due to a thermal expansion difference.

Another disclosure is an external thread member including a shaft portion having a threaded portion and a head portion, in which the shaft portion is inserted into a mounting hole of a mounting member through a collar and the mounting member is fastened to a fastening member, wherein the collar is integrally assembled into the shaft portion, the collar includes a tubular portion and a flange portion formed at one end of the tubular portion, and the flange portion is in direct contact with an opening edge of a mounting hole of the mounting member, and when an insertion hole corresponding to the mounting hole passes through the fastening member, and an internal thread member to which the threaded portion of the external thread member is screwed is disposed at an opening of the insertion hole, an axial length of the tubular portion of the collar is larger than a sum of an axial length of the mounting hole and an axial length of the insertion hole by an amount corresponding to a difference between an amount of elongation of the collar and an amount of elongation due to thermal expansion of the mounting member and the fastening member at a highest temperature of an expected service environment.

The shaft portion may include a non-threaded neck portion between the threaded portion and the head portion, and the collar may be mounted on the neck portion so as to be rotatable relative to each other.

When the engagement portion is the threaded portion, and an inner diameter of the collar is larger than an outer diameter of the neck portion and is smaller than an outer diameter of the threaded portion, retention of the collar can be achieved by the threaded portion.

A locking means that restricts rotation relative to the mounting member may be provided in the collar.

The locking means may be a tapered surface, which bites into an inner circumference of the mounting hole, on an outer circumferential surface of the collar and may be an uneven portion formed on an outer circumferential surface of the collar.

The locking means may be configured as a flexibly deformable flange portion having a spring property formed in the collar, and the flange portion may be pressure-welded to a periphery of the mounting hole of the mounting member in a flexibly deformed state.

The external thread member may be a tapping screw including a tapping screw portion in which an internal thread is formed in a prepared hole at an end of the shaft portion.

Advantageous Effects of the Disclosure

It is possible to perform a fastening operation efficiently without increasing the number of parts by integrally assembling a collar into an external thread member. Particularly, it is possible to avoid thermal stress which can occur in a mounting member due to a thermal expansion difference.

DRAWINGS

FIG. 1 illustrates a fastening structure of an external thread member according to Embodiment 1 of the present disclosure, in which FIG. 1(A) is a cross-sectional view of an external thread member and a fastening portion before fastening and FIG. 1(B) is a cross-sectional view after an external thread member is fastened;

Figure 2:
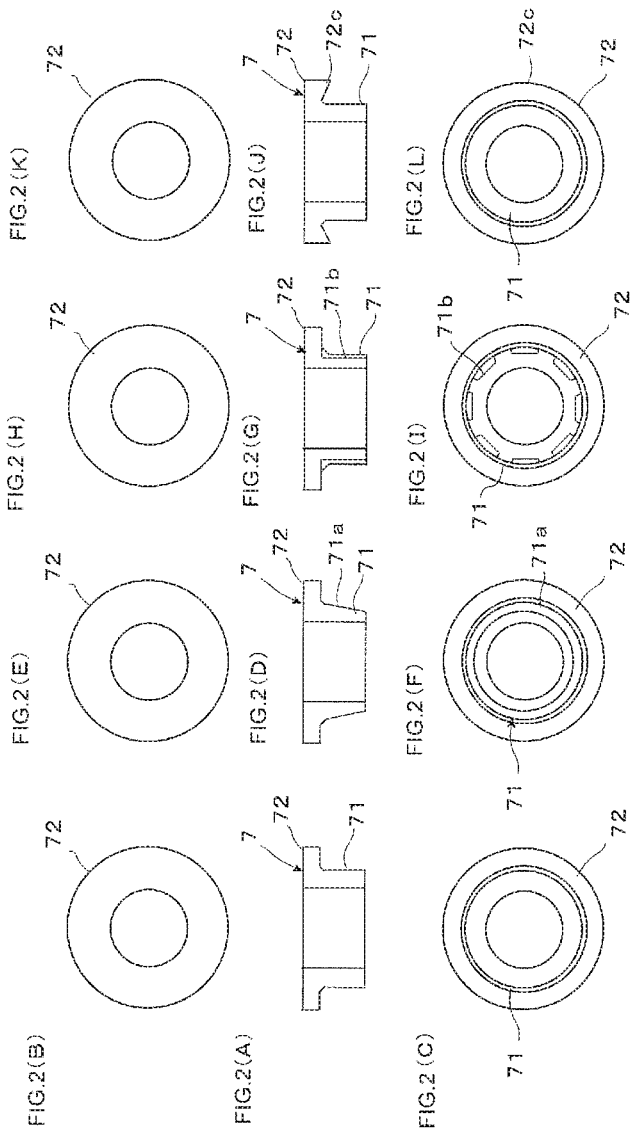
FIG. 2(A) is a cross-sectional view of a collar illustrated in FIG. 1.

FIG. 2(B) is a plan view of FIG. 2(A).
FIG. 2(C) is a bottom view of FIG. 2(A).
FIG. 2(D) is a cross-sectional view of another collar.
FIG. 2(E) is a plan view of FIG. 2(D).
FIG. 2(F) is a bottom view of FIG. 2(D).
FIG. 2(G) is a cross-sectional view of still another collar.
FIG. 2(H) is a plan view of FIG. 2(G).
FIG. 2(I) is a bottom view of FIG. 2(G).
FIG. 2(J) is a cross-sectional view of still another collar.
FIG. 2(K) is a plan view of FIG. 2(J).
FIG. 2(L) is a bottom view of FIG. 2(J).

Figure 1:
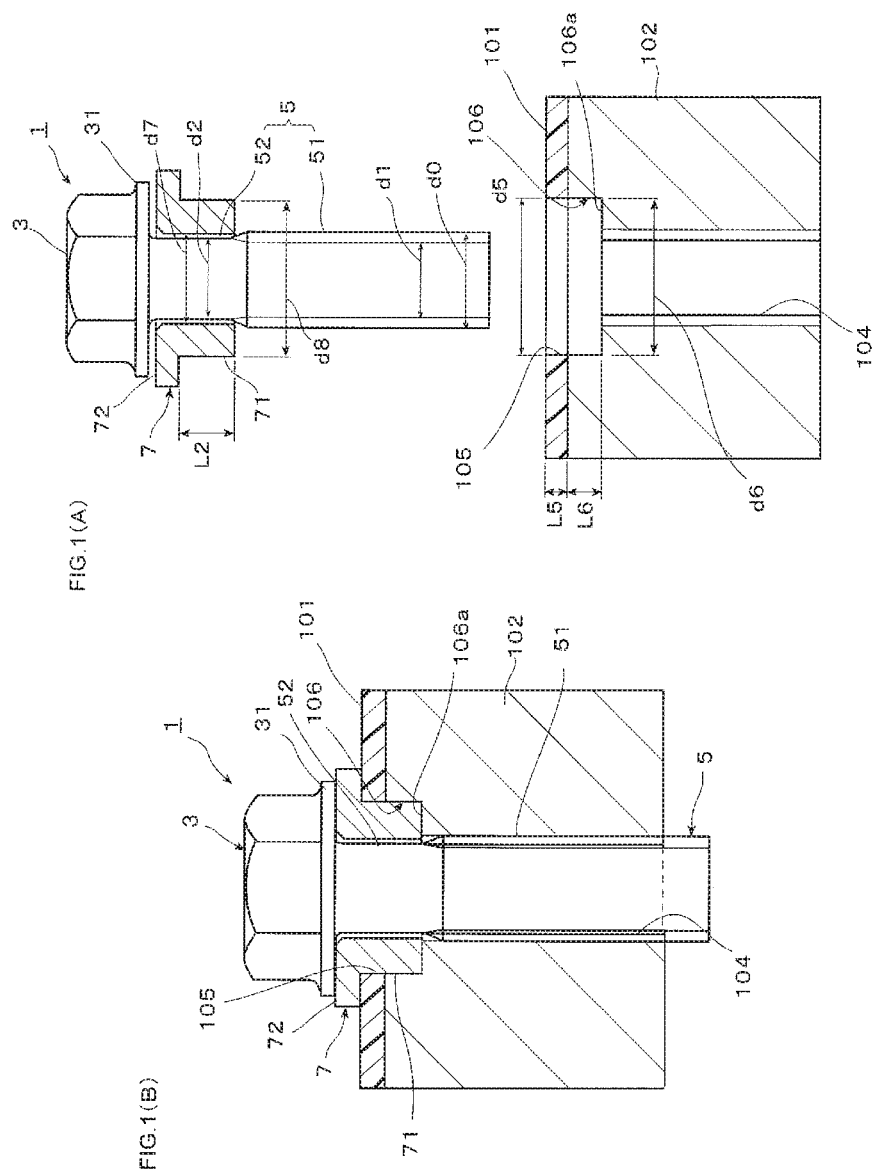
Figure 3:
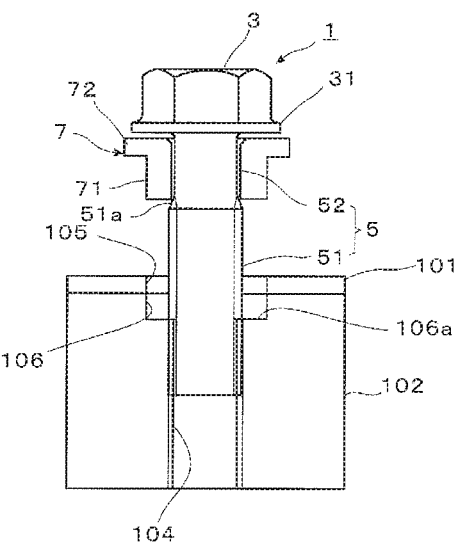
Figure 3:
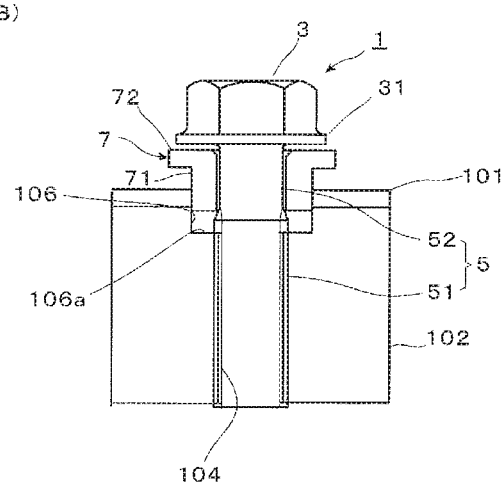

FIGS. 3(A) and 3(B) are cross-sectional views illustrating an order of fastening the external thread member illustrated in FIG. 1.

FIGS. 4(A) to 4(D) are diagrams illustrating steps of manufacturing the external thread member according to the present disclosure.

Figure 5A:
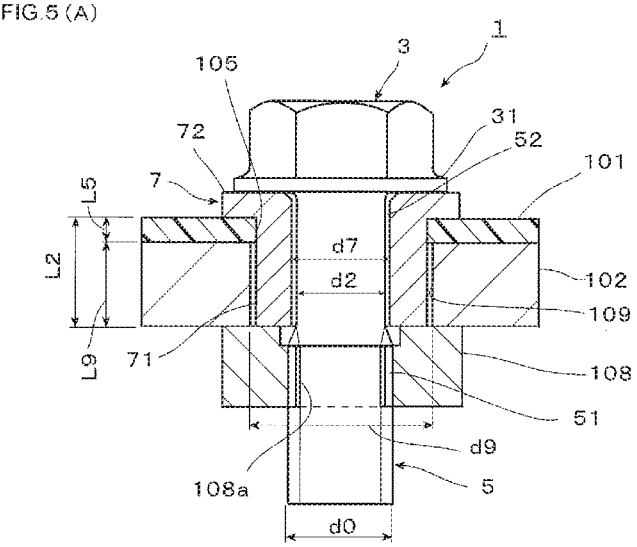
Figure 5C:
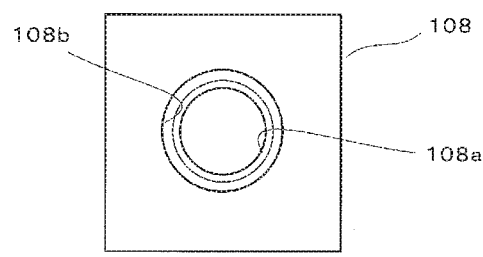
Figure 5B:
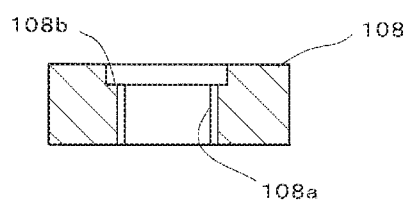

FIG. 5 illustrates a fastening structure of an external thread member according to Embodiment 2 of the present disclosure, in which FIG. 5(A) is a cross-sectional view, FIG. 5(B) is a cross-sectional view of a internal thread member, and FIG. 5(C) is a plan view of FIG. 5(B).

FIGS. 6(A) to 6(D) are diagrams illustrating various configuration examples of collar holding means.

Figure 7:
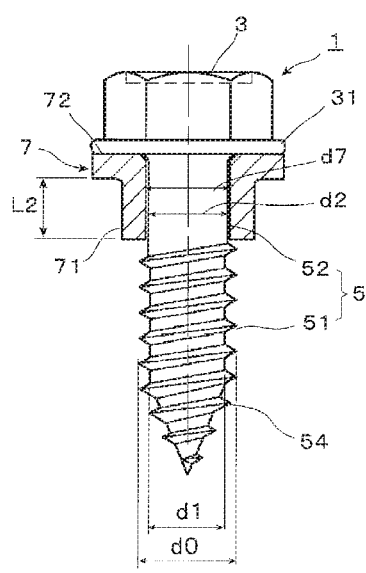

FIG. 7 is a diagram illustrating a configuration example of an external thread member configured as a tapping screw.

FIG. 8(A) is a compression-side adjustment valve of a fastening structure according to a reference example of present example.

FIG. 8(B) is a half-cross-sectional view illustrating an internal thread member having a collar assembled therein.

FIG. 8(C) is a cross-sectional view of a collar having a projection.

FIG. 8(D) is a plan view of FIG. 8(C).

FIG. 8(E) is a cross-sectional view illustrating an example in which a collar is held in an internal thread member using a retaining piece.

FIG. 8(F) is a plan view of FIG. 8(E).

Figure 9A:
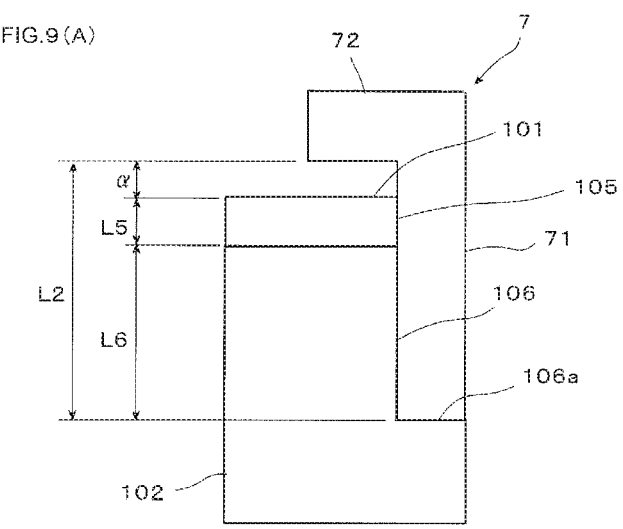
Figure 9B:
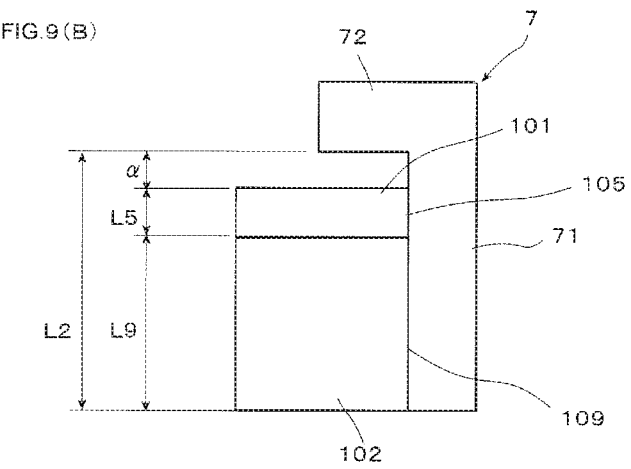

FIGS. 9(A) and 9(B) are diagrams schematically illustrating various dimensional relations of Embodiments 1 and 2.

DETAILED DESCRIPTION

Hereinafter, the present disclosure will be described in detail on the basis of illustrated embodiments.

Embodiment 1

FIG. 1 illustrates a fastening structure which uses an external thread member according to Embodiment 1 of the present disclosure.

As illustrated in FIG. 1, an external thread member 1 has a head portion 3 and a shaft portion 5 and is used for fixing a resin panel 101, which is a mounting member, to a fastening member 102. The resin panel 101 is a panel formed of a resin which uses a resin material or a fiber-reinforced resin material such as CFRP and is configured such that a mounting hole 105 for the external thread member 1 is formed and the shaft portion 5 is inserted therein through a collar 7, the collar 7 being mounted in an inner circumference of the mounting hole 105.

The external thread member 1 of the present disclosure has a configuration in which the collar 7 is integrally assembled to the shaft portion 5 in advance. In this embodiment, the shaft portion 5 has a threaded portion 51 and a neck portion 52 provided between the threaded portion 51 and the head portion 3, and the collar 7 is attached to the neck portion 52 in a freely rotatable manner.

The collar 7 engages with the threaded portion 51 so that movement toward a distal end is restricted and retention of the collar 7 is realized.

Hereinafter, configuration of respective parts will be described in detail.

In the illustrated example, although the external thread member 1 is a hexagonal bolt and has a flange portion 31 formed in a lower edge of the head portion 3, various shapes such as a pan head or a hexagon head without a flange portion may be applied to the head portion 3.

The shaft portion 5 is configured such that a diameter d2 of the neck portion 52 is larger than a root diameter d1 of the threaded portion 51 and is smaller than an outer diameter (a nominal diameter) d0.

The collar 7 has a cylindrical shape with flange (see FIGS. 2(A) to 2(C)) and includes a cylindrical portion 71 as a tubular portion and a flange portion 72 provided at one end of the cylindrical portion 71. The flange portion 72 has a larger outer diameter than the outer diameter of the flange portion 31 of the head portion 3 and is in contact with an opening edge of the mounting hole 105 of the resin panel 101 to function as a seat surface of the head portion 3.

An inner diameter d7 of the cylindrical portion 71 of the collar 7 is set to be larger than a diameter d2 of the neck portion 52 of the shaft portion 5 and smaller than an outer diameter d0 of the threaded portion 51. An outer diameter d8 of the cylindrical portion 71 of the collar 7 is equal to or slightly larger than an inner diameter d5 of the mounting hole 105 of the resin panel 101, and the cylindrical portion 71 is press-fitted into the mounting hole 105.

An internal thread hole 104 corresponding to the mounting hole 105 is formed in the fastening member 102 to which the resin panel 101 is attached, and a counterbore hole 106 is formed in an opening close to the mounting hole 105 of the internal thread hole 104. A hole diameter d6 of the counterbore hole 106 is slightly larger than the outer diameter d8 of the cylindrical portion 71 of the collar 7 so that the collar 7 is inserted smoothly.

An axial length L2 of the cylindrical portion 71 of the collar 7 inserted into the mounting hole 105 is set to be equal to or slightly larger than a length (L5+L6) which is a sum of a length L5 (the thickness of the resin panel 101) of the mounting hole 105 and a depth L6 of the counterbore hole 106.

Next, an operation of fastening the resin panel 101 to the fastening member 102 will be described.

A fastening operation involves fitting the shaft portion 5 of the external thread member 1 into an opening of the internal thread hole 104 and screwing the shaft portion 5 into the internal thread hole 104 (see FIG. 3(A)). In this case, the collar 7 mounted in the neck portion 52 engages with an end of the threaded portion 51 and is held in the neck portion 52. Since an incomplete threaded portion 51a is present at an end of the threaded portion 51, an inner circumferential edge of a lower end of the collar 7 is caught in the middle of the incomplete threaded portion 51a.

When the external thread member 1 is rotated further to be screwed into the internal thread hole 104, the cylindrical portion 71 of the collar 7 enters into the inner circumference of the counterbore hole 106 from the mounting hole 105 of the resin panel 101 (see FIG. 3(B)), and a distal end surface of the cylindrical portion 71 comes in contact with a bottom surface 106a of the counterbore hole 106.

Furthermore, when the external thread member 1 is screwed into the internal thread hole 104, the contact pressure between the seat surface of the head portion 3 and the bottom surface 106a of the counterbore hole 106 of the cylindrical portion 71 increases, tensile load acting on the neck portion 52 as a reaction thereof increases, and the fastening operation is completed. During fastening, since the seat surface of the head portion 3 is fastened by generating friction on an upper surface of the flange portion 72 of the collar 7 rather than the resin panel 101, it is possible to generate stable axial thrust.

The axial thrust acting on the shaft portion 5 of the external thread member 1 is applied by the collar 7 and does not act on the resin panel 101. Therefore, it is possible to prevent decrease in the axial thrust resulting from creep deformation of the resin panel 101.

As for a shape of the collar 7, it is ideal to realize locking between the collar 7 and the resin panel 101 so that the force of fixing to the resin panel 101 is strengthened further.

FIGS. 2(D) to 2(L) illustrate configuration examples of locking means provided in the collar 7.

In FIGS. 2(D) to 2(F), an outer circumferential surface of the cylindrical portion 71 of the collar 7 is configured as a tapered surface so that the tapered surface 71a bites into an inner circumferential surface of the mounting hole 105 due to a wedge effect to increase the contact pressure and increase a frictional force to realize locking.

In FIGS. 2(G) to 2(I), a serration 71b as an uneven portion is provided in an outer circumference of the cylindrical portion 71 of the collar 7.

In FIGS. 2(J) to 2(L), the flange portion 72 has a spring property that the flange portion 72 can be flexibly deformed, and the flange portion 72 is pressure-welded to the periphery of the mounting hole 105 of the resin panel 101 in a flexibly deformed state.

That is, a convex portion 72c is provided on an outer edge of the lower surface of the flange portion 72 of the collar 7 so that the flange portion 72 is flexibly deformed about the convex portion 72c to provide a spring property to an extent that creep deformation does not occur. Moreover, even if permanent strain occurs in the resin panel 101, the flange portion follows the permanent strain.

In the illustrated example, the lower surface of the flange portion 72 is a tapered surface in which the flange portion 72 is inclined so that the thickness of the flange portion 72 gradually decreases from the convex portion 72c toward the root of the cylindrical portion 71, and the root is easily elastically deformed.

Various configurations can be applied as the locking means without being limited to the above-described configurations.

Next, a method of manufacturing the external thread member according to the present embodiment will be described with reference to FIG. 4.

The external thread member manufacturing method includes a screw blank molding step (FIG. 4(A)), a collar assembling step (FIGS. 4(B) and 4(C)), and a rolling step (FIG. 4(D)).

A screw blank 201 is molded by molding the head portion 3 and a shaft portion 205 using a header, and an outer circumferential surface of the shaft portion 205 is a cylindrical surface in which the threaded portion is not yet formed. An outer diameter of the shaft portion 205 is the same as the outer diameter d2 of the neck portion 52 of the external thread member 1.

In the collar assembling step, the collar 7 is assembled into the shaft portion 205 of the screw blank 201. An inner diameter d7 of the collar 7 is larger than the diameter d2 of the shaft portion 205, and the flange portion 72 is inserted from a distal end of the blank shaft 205 toward the head portion 3 until the flange portion 72 comes in contact with the seat surface of the head portion 3.

The rolling step involves forming a threaded portion using well-known rolling dies.

The rolling dies have a cross-sectional shape which is an inversion of the shape of a threaded portion although not illustrated particularly, valleys of rolled screw ridges have a smaller diameter than the outer circumference of the shaft portion 205, apexes of the screw ridges have a larger diameter than the outer circumference of the shaft portion 205, and the outer diameter d0 is larger than the inner diameter d7 of the collar 7. An end position of the incomplete threaded portion 51a formed close to the head portion, of the threaded portion 51 corresponds to a position near the distal end surface of the collar 7.

When the threaded portion 51 is completed, the collar 7 engages with the rolled threaded portion 51 and retention from the shaft portion 5 is achieved.

By doing so, it is possible to integrally assemble the collar 7 into the external thread member 1 easily just by adding a step of inserting the collar 7 to general screw manufacturing steps.

Although the external thread member 1 is configured to be screwed into the internal thread hole 104 having an internal thread formed in the fastening member 102, as illustrated in FIG. 7, the external thread member 1 may be configured as a tapping screw having a tapping screw portion 54 so that the external thread member 1 is fastened while forming a thread in a prepared hole formed in the fastening member 102.

Embodiment 2

Next, a fastening structure which uses an external thread member according to another embodiment of the present disclosure will be described with reference to FIG. 5. In the following description, only the difference from Embodiment 1 will be described, and the same components will be denoted by the same reference numerals and the description thereof will be omitted.

In this embodiment, the internal thread hole 104 is not formed in the fastening member 102, an insertion hole 109 having a slightly larger diameter than the mounting hole 105 of the resin panel passes through the fastening member 102, and an internal thread member 108 to which the threaded portion 51 of the external thread member 1 is screwed is disposed on an opening side of the insertion hole 109. Moreover, the external thread member 1 and the internal thread member 108 are fastened with the resin panel 101 and the fastening member 102 disposed therebetween. That is, the threaded portion 51 of the shaft portion 5 of the external thread member 1 is screwed into an internal thread 108a on the inner circumference of the internal thread member 108.

In this case, the length L2 of the cylindrical portion 71 of the collar 7 is set to be slightly larger than or equal to a length (L5+L9) which is the sum of the axial lengths of the mounting hole 105 and the insertion hole 109.

A non-threaded step 108b of which the diameter is extended by an amount corresponding to the incomplete threaded portion 51a of the threaded portion 51 of the external thread member 1 is formed in an opening close to the fastening member 102, of the inner circumference of the internal thread member 108, and interference between the incomplete threaded portion 51a and the internal thread 108a during fastening is avoided.

Relation Among Length (L2) of Cylindrical Portion 71 of Collar 7, Length (L5) of Mounting Hole 105, Depth (L6) of Counterbore Hole 106 of Fastening Member, and Length (L9) of Insertion Hole 109

Here, dimensional relations of Embodiments 1 and 2 will be described with reference to FIG. 9.

FIGS. 9(A) and 9(B) schematically illustrate dimensional relations of Embodiments 1 and 2, respectively.

Since the depth L6 of the counterbore hole 106 of the fastening member 102 with an internal thread of Embodiment 1 and the length L9 of the insertion hole 109 of the fastening member 102 of Embodiment 2 are the same in that load is supported by the collar 7, the case of Embodiment 1 will be described by way of an example in the following description.

When α=L2−(L5+L6), since L2≥L5+L6, α≥0    Expression 1 is satisfied.

When the linear expansion coefficients (/° C.) of the collar 7, the resin panel 101, and the fastening member 102 are A, B, and C, respectively, and a highest temperature in a service environment is Tmax (° C.), the range of a is expressed as follows.

"0≤α≤{(L5×B)+(L6×C)−(L2×A)}×Tmax"    (Expression 2)

However, Expression 2 is applied when (L5×B)+(L6×C)−(L2×A)>0 only.

That is, since it is expected that an amount of elongation due to thermal expansion of the resin panel 101 and the fastening member 102 is larger than an amount of elongation of the collar 7, a difference from the amount of elongation of the collar is set in advance as a gap so that thermal stress does not occur in the resin panel 101.

For example, when Tmax is 300° C., a is set in the following range.

0≤α≤{(L5×B)+(L6×C)−(L2×A)}×300

Moreover, when Tmax is 150° C., a is set in the following range.

0≤α≤{(L5×B)+(L6×C)−(L2×A)}×150

When the fastening member 102 is divided into a plurality of members, the thicknesses of the respective fastening members are La, Lb, . . . , and Lx, and the linear expansion coefficients (/° C.) are Ca, Cb, . . . , and Cx, "C" in Expression 2 is replaced as follows.

C={(La×Ca)+(Lb×Cb)+ . . . (Lx×Cx)}/(La+Lb+ . . . Lx)

Various Examples of Collar Holding Means

Figure 6A:
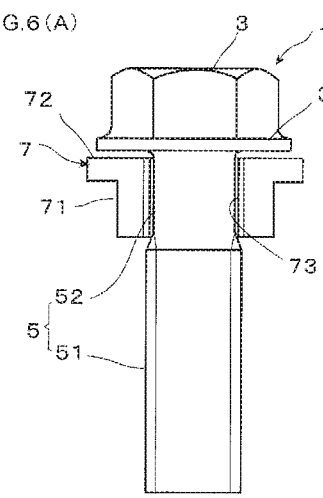

In Embodiments 1 and 2 described above, the threaded portion 51 is rolled after the collar 7 is mounted and retention of the collar 7 is achieved by the threaded portion 51. However, even after rolling is performed, for example, as illustrated in FIG. 6(A), when an internal thread 73 to which the threaded portion 51 is screwed is formed in the inner circumference of the collar 7, the collar 7 may be rotated along the threaded portion 51 so as to be conveyed up to the neck portion 52 and the collar 7 can be rotatably mounted into the neck portion 52.

Figure 6B:
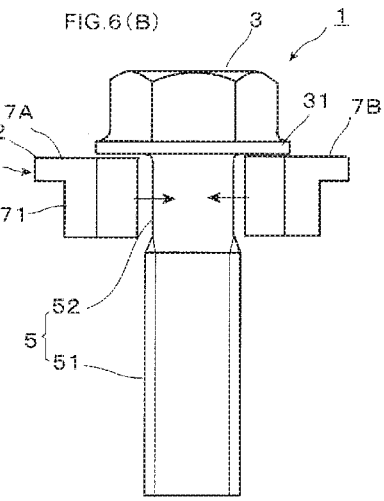

Moreover, as illustrated in FIG. 6(B), the collar 7 may be divided into two pieces by a surface that passes through a central axis, and the dividing surface may be fixed by the neck portion 52 is pinched by the divided pieces 7A and 7B from both sides thereof.

In the embodiments described above, retention of the collar 7 is achieved by the threaded portion 51. However, various configurations can be applied as means for holding the collar 7 on the shaft portion 5.

Figure 6C:
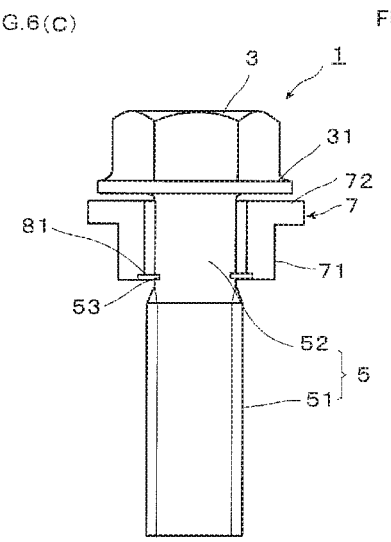

For example, as illustrated in FIG. 6(C), retention may be achieved by mounting a retention snap ring 81 into the neck portion 52. In the illustrated example, the snap ring 81 engages with a groove 53 formed in the neck portion 52. However, a member such as a locking washer that is elastically held on the shaft portion 5 may be used rather than forming a groove.

Figure 6D:
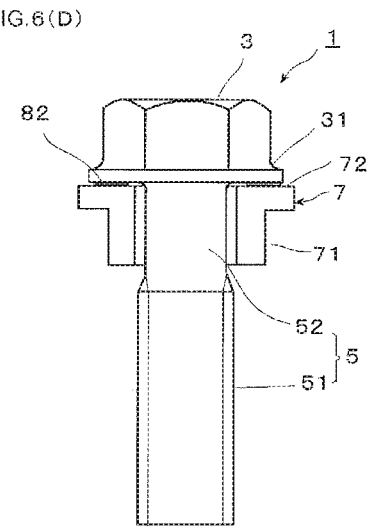

Moreover, as illustrated in FIG. 6(D), the collar 7 may be held on the head portion 3 by an adhesive 82. The adhesive 82 may have an adhesive strength that the adhesive 82 is broken by shearing force that acts during fastening.

Instead of mechanical engagement, the collar 7 may be magnetically absorbed to the head portion 3 or the shaft portion 5. In this case, a magnet may be embedded in the collar 7 and the collar itself may be magnetized.

Reference Example

Next, a reference example of the present disclosure will be described with reference to FIG. 8.

A basic fastening structure is similar to that of FIG. 5, only the difference will be described in the following description, the same components will be denoted by the same reference numerals, and the description thereof will be omitted.

This embodiment is different in that the collar 7 is integrally assembled to the internal thread member 208 rather than the external thread member 1.

That is, the internal thread member 208 is screwed into the shaft portion 5 of the external thread member 1 which is inserted into the mounting hole 105 of the resin panel 101 as a mounting member through the collar 7, the resin panel 101 is fastened to the fastening member 102, and the collar 7 is integrally assembled to the internal thread member 208. The inner diameter d7 of the collar 7 is larger than the outer diameter d0 of the threaded portion 51.

Contrary to FIG. 5, the internal thread member 208 comes in contact with the flange portion 72 of the collar 7 mounted into the mounting hole 105, the shaft portion 5 of the external thread member 1 is inserted from the insertion hole 109 of the fastening member 102, and the head portion 3 comes in contact with the periphery of the insertion hole 109 of the fastening member 102.

As illustrated in FIG. 8(B), the collar 7 may be held on the internal thread member 208 by an adhesive 82 so that the collar 7 does not fall and may be held by magnetic force. The adhesive 82 has an adhesive strength that the adhesive 82 is broken by shearing force during a fastening operation.

As illustrated in FIGS. 8(C) and 8(D), an annular projection 72d may be formed on a surface of the collar 7 facing the internal thread member 208 of the flange portion 72 and an annular groove (not illustrated) may be formed in the corresponding internal thread member 208. In this way, it is possible to achieve positioning of the central lines of the collar 7 and the internal thread member 208.

Moreover, as illustrated in FIGS. 8(E) and 8(F), the collar 7 may be held on the internal thread member 208 in a freely rotatable manner with a retaining piece 210 which is a joint member disposed therebetween.

The retaining piece 210 may include a ring portion 211 fitted to the outer circumference of the internal thread member 208 and an elastic locking piece 212 extending from the ring portion 211 toward the collar 7 so that the elastic locking piece 212 engages with an annular step 72a formed in the outer circumference of the flange portion 72 in a freely slidable manner.

The means for holding the collar 7 is not limited to the above-described configurations but various configurations may be employed.

In a fastening operation, when the collar 7 is mounted into the mounting hole 105, the internal thread member 208 is positioned in an opening of the mounting hole 105. In this state, the shaft portion 5 of the external thread member 1 is inserted from the insertion hole 109 of the fastening member 102 through the collar 7 and is screwed into the internal thread 208a of the internal thread member 208 whereby the external thread member 1 is fastened and fixed.

When the collar 7 is assembled into the internal thread member 208 in this manner, it is not necessary to provide a collar to the mounting member, and it is possible to reduce the number of parts and to reduce the number of steps of the fastening operation.

In the embodiments described above, the flanged collar 7 has been described by way of an example. However, a pipe-shaped collar without a flange may be used, and the collar may be inserted into a mounting hole of a mounting member such as a resin panel and may function as a spacer that bears an axial thrust of the external thread member.

Moreover, a case in which the resin panel 101 is fixed to a rigid fastening member such as metal has been described. However, the mounting member is not limited to a resin panel, but various materials such as a material in which creep deformation easily occurs or a soft material may be used and a hard material such as metal in which creep deformation rarely occurs may be used. When a protection collar is used even if the mounting member is formed of a material in which creep deformation rarely occurs, it is possible to reduce the number of parts and to reduce the number of steps.

Moreover, in the embodiments described above, the collar is formed of a hard material such as a metal material the same as the external thread member and the internal thread member. However, a resin material may be used in an application in which creep deformation does not cause any problem.

Furthermore, the materials of the external thread member, the internal thread member, and the fastening member are not limited to a metal material but an appropriate material such as a resin material may be selected depending on the use.

REFERENCE SIGNS LIST

1 External thread member
3 Head portion
31 Flange portion
5 Shaft portion
51 Threaded portion
51a Incomplete threaded portion
52 Neck portion
53 Groove
7 Collar
71 Cylindrical portion
71a Tapered surface
71b Serration
72 Flange portion
72c Convex portion
73 Internal thread
81 Snap ring
7A, 7B Divided piece
101 Resin panel (Mounting member)
102 Fastening member
104 Internal thread hole
105 Mounting hole
106 Counterbore hole
106a Bottom surface
107 Insertion hole
108 Internal thread member
201 Screw blank
202 Fastening member
205 Blank shaft
207 Insertion hole
208 Internal thread member
d0 Outer diameter (nominal diameter) of threaded portion
d1 Root diameter of threaded portion
d2 Diameter of neck portion
d7 Inner diameter of collar

The invention claimed is:

1. An external thread member including a shaft portion having a threaded portion and a head portion, in which the shaft portion is inserted into a mounting hole of a mounting member through a collar and the mounting member is fastened to a fastening member, wherein the collar is integrally assembled into the shaft portion, the collar includes a tubular portion and a flange portion formed at one end of the tubular portion, and the flange portion is in direct contact with an opening edge of a mounting hole of the mounting member, and when an internal thread hole corresponding to the mounting hole is formed in the fastening member to which the mounting member is attached, and a counterbore hole is formed at an opening close to the mounting hole of the internal thread hole, an axial length of the tubular portion inserted into the mounting hole of the collar is larger than a sum of an axial length of the mounting hole and a depth of the counterbore hole by an amount corresponding to a difference between an amount of elongation of the collar and an amount of elongation due to thermal expansion of the mounting member and the fastening member at a highest temperature of an expected service environment.

2. The external thread member according to claim 1, wherein the shaft portion includes a non-threaded neck portion between the threaded portion and the head portion, and the collar is mounted on the neck portion so as to be rotatable relative to each other.

3. The external thread member according to claim 2, wherein an inner diameter of the collar is larger than an outer diameter of the neck portion and is smaller than an outer diameter of the threaded portion, and retention of the collar is achieved by the threaded portion.

4. The external thread member according to claim 3, wherein a locking means that restricts rotation relative to the mounting member is provided in the collar.

5. The external thread member according to claim 3, wherein the external thread member is a tapping screw including a tapping screw portion in which an internal thread is formed in a prepared hole at an end of the shaft portion.

6. The external thread member according to claim 2, wherein a locking means that restricts rotation relative to the mounting member is provided in the collar.

7. The external thread member according to claim 2, wherein the external thread member is a tapping screw including a tapping screw portion in which an internal thread is formed in a prepared hole at an end of the shaft portion.

8. The external thread member according to claim 1, wherein a locking means that restricts rotation relative to the mounting member is provided in the collar.

9. The external thread member according to claim 8, wherein the locking means is a tapered surface, which bites into an inner circumference of the mounting hole, on an outer circumferential surface of the collar.

10. The external thread member according to claim 9, wherein the external thread member is a tapping screw including a tapping screw portion in which an internal thread is formed in a prepared hole at an end of the shaft portion.

11. The external thread member according to claim 8, wherein the locking means is an uneven portion formed on an outer circumferential surface of the collar.

12. The external thread member according to claim 11, wherein the external thread member is a tapping screw including a tapping screw portion in which an internal thread is formed in a prepared hole at an end of the shaft portion.

13. The external thread member according to claim 8, wherein the locking means is configured as a flexibly deformable flange portion having a spring property formed at the collar, and the flange portion is pressure-welded to a periphery of the mounting hole of the mounting member in a flexibly deformed state.

14. The external thread member according to claim 13, wherein the external thread member is a tapping screw including a tapping screw portion in which an internal thread is formed in a prepared hole at an end of the shaft portion.

15. The external thread member according to claim 8, wherein the external thread member is a tapping screw including a tapping screw portion in which an internal thread is formed in a prepared hole at an end of the shaft portion.

16. The external thread member according to claim 1, wherein the external thread member is a tapping screw including a tapping screw portion in which an internal thread is formed in a prepared hole at an end of the shaft portion.

17. An external thread member including a shaft portion having a threaded portion and a head portion, in which the shaft portion is inserted into a mounting hole of a mounting member through a collar and the mounting member is fastened to a fastening member, wherein the collar is integrally assembled into the shaft portion, the collar includes a tubular portion and a flange portion formed at one end of the tubular portion, and the flange portion is in direct contact with an opening edge of a mounting hole of the mounting member, and when an insertion hole corresponding to the mounting hole also passes through the fastening member, and an internal thread member to which the threaded portion of the external thread member is screwed is disposed at an opening of the insertion hole, an axial length of the tubular portion of the collar is larger than a sum of an axial length of the mounting hole and an axial length of the insertion hole by an amount corresponding to a difference between an amount of elongation of the collar and an amount of elongation due to thermal expansion of the mounting member and the fastening member at a highest temperature of an expected service environment.

18. The external thread member according to claim 17, wherein the shaft portion includes a non-threaded neck portion between the threaded portion and the head portion, and the collar is mounted on the neck portion so as to be rotatable relative to each other.

19. The external thread member according to claim 17, wherein a locking means that restricts rotation relative to the mounting member is provided in the collar.

20. The external thread member according to claim 17, wherein the external thread member is a tapping screw including a tapping screw portion in which an internal thread is formed in a prepared hole at an end of the shaft portion.

* * * * *